US 6,577,246 B1

(12) United States Patent
Handa et al.

(10) Patent No.: US 6,577,246 B1
(45) Date of Patent: Jun. 10, 2003

(54) ELECTROMAGNETIC WAVE LANE MARKER, DEVICE FOR DETECTING ELECTROMAGNETIC WAVE LANE MARKER, AND TRAFFIC SYSTEM

(75) Inventors: Satoru Handa, Nara (JP); Yoshihiko Tanji, Osaka (JP); Akira Nakatsuka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/744,456

(22) PCT Filed: May 23, 2000

(86) PCT No.: PCT/JP00/03272

§ 371 (c)(1),
(2), (4) Date: Apr. 21, 2001

(87) PCT Pub. No.: WO00/72288

PCT Pub. Date: Nov. 30, 2000

(30) Foreign Application Priority Data

May 25, 1999 (JP) .......................................... 11-144858

(51) Int. Cl.⁷ ................................................. G08G 1/00
(52) U.S. Cl. ............. 340/901; 340/825.36; 340/825.49; 701/23; 701/117; 702/94
(58) Field of Search .................................. 340/901, 908, 340/941, 686, 933, 928, 905, 825.36, 825.49; 702/150, 94, 95; 324/207.13; 180/168; 701/23, 117

(56) References Cited

U.S. PATENT DOCUMENTS

| 5,021,778 | A | * | 6/1991 | Walton .................. 340/825.54 |
| 5,196,846 | A | * | 3/1993 | Brockelsby et al. ......... 340/933 |
| 5,318,143 | A | * | 6/1994 | Parker et al. ................ 180/168 |
| 5,347,456 | A | * | 9/1994 | Zhang et al. .................. 701/23 |
| 5,426,363 | A | * | 6/1995 | Akagi et al. ................. 324/239 |
| 5,708,427 | A | * | 1/1998 | Bush .......................... 340/941 |
| 5,867,089 | A | * | 2/1999 | Zyburt et al. ........... 340/323 R |
| 5,928,294 | A | * | 7/1999 | Zelinkovsky ................. 701/24 |
| 5,987,374 | A | * | 11/1999 | Akutsu et al. .............. 701/117 |
| 6,032,110 | A | * | 2/2000 | Ishihara et al. ............. 702/150 |
| 6,081,187 | A | * | 6/2000 | Akutsu ........................ 340/436 |
| 6,100,821 | A | * | 8/2000 | Tanji et al. .................. 340/988 |

FOREIGN PATENT DOCUMENTS

| JP | 59-127115 | 7/1984 |
| JP | 7-244788 | 9/1995 |
| JP | 11-73600 | 3/1999 |
| JP | 11-339187 | 12/1999 |
| JP | 2000-123285 | 4/2000 |

OTHER PUBLICATIONS

Japanese search report for PCT/JP00/03272 dated Aug. 1, 2000.

* cited by examiner

*Primary Examiner*—Toan Pham
(74) *Attorney, Agent, or Firm*—RatnerPrestia

(57) ABSTRACT

The level of the electromagnetic waves transmitted by resonance of an electric resonator is only one hundredth that of calling radio waves of the detector. Furthermore, when an IC is mounted on the electric resonator and a modulated information code is superposed, the level of the superimposed electromagnetic waves further declines. As a result, sufficient detection directivity and detection distance could not be obtained. To address these problems, the present invention stores a cyclic coil and a capacitor used to cause an electric resonance in response to the first frequency in a sealed non-magnetic container to prevent degradation.

29 Claims, 5 Drawing Sheets

ELECTROMAGNETIC WAVE LANE MARKER, DEVICE FOR DETECTING ELECTROMAGNETIC WAVE LANE MARKER, AND TRAFFIC SYSTEM

This Application is a U.S. National Phase Application of PCT International Application PCT/JP00/03272.

FIELD OF THE INVENTION

The present invention relates to a vehicle positioning system in which the position of the vehicle on a road is determined by detecting electromagnetic lane markers laid under the road with an electromagnetic lane marker detector installed on the vehicle.

BACKGROUND OF THE INVENTION

Information about road conditions including lanes and curves has been provided by such lane marks as white lines and traffic signs, and drivers check them visually.

However, when visibility is low at night or as a result of weather conditions, it is difficult for drivers to correctly obtain information of the road visually, thus safety on the road can be threatened. To prevent road hazards, magnetic nails have been tried to provide road information to drivers. However, when trying to enhance detectivity of these magnetic nails by making them ferromagnetic, they tend to attract metallic pieces left on the road. This increases the risk of puncture, a problem which does not coincide with increasing performance. As such, problems regarding the magnetic nail have not yet been solved.

Electrical resonators have been sometimes used as an anti-theft device. In this field, an electrical resonator is mounted on a film and attached to a product so that a device that can detect the electrical resonator, installed at the entrance of the shop, can detect to it. The electrical resonators have also been applied to the non-contacting card system where information recorded on IC mounted on an electrical resonator is read out.

However, the level of the electromagnetic waves emitted by a resonance of the electric resonator is very weak compared with the level of calling electromagnetic waves transmitted by a detector; normally it is only about one millionth of that of the calling waves. When an IC is mounted on an electric resonator, and a modulated information code is superposed, the level of the superposed electromagnetic waves further declines. Consequently, when transmitting and receiving the electromagnetic waves of the same frequencies, interference of the calling waves becomes unavoidable, thereby obstructing achievement of sufficient directivity and detection distance.

SUMMARY OF THE INVENTION

A first electromagnetic lane marker of the present invention include an electric resonator comprising a cyclic coil and a capacitor, which resonates with inductive electromagnetic wave of a first frequency. The electromagnetic lane marker further includes a frequency conversion circuit coupled to the electromagnetic resonator, and transmits electromagnetic waves of a second frequency which was converted from the resonated first frequency.

A second electromagnetic lane marker of the present invention include an electronic resonator comprising a first cyclic coil and a capacitor, which resonates with inductive electromagnetic wave of a first frequency, a frequency conversion circuit coupled to the electronic resonator, which converts the electromagnetic wave of the first frequency to electromagnetic wave of a second frequency, and a second cyclic coil which transmits the electromagnetic wave of the second frequency.

A third electromagnetic lane marker of the present invention include
an electronic resonator comprising a first cyclic coil and capacitors connected to both ends of the first cyclic coil, which resonates with inductive electromagnetic wave of a first frequency, a frequency conversion circuit coupled to said electronic resonator, which converts the electromagnetic wave of the first frequency to electromagnetic wave of a second frequency, and a second cyclic coil which transmits the electromagnetic wave of the second frequency. And, the electric resonator, the frequency conversion circuit and the second cyclic coil are stored in a sealing container made of a non-magnetic material.

In a fourth electromagnetic lane marker, the sealing container of the third lane marker is cylindrical with a bottom base and a lid.

A fifth electromagnetic lane marker is constructed based on the second through fourth lane markers, in which the first and second cyclic coils are formed respectively with a loop antenna and a bar antenna.

A sixth electromagnetic lane marker is constructed based on the second through fourth lane markers, in which the first and second cyclic coils are formed respectively with a bar antenna and a loop antenna.

A seventh electromagnetic lane marker is constructed based on the second lane marker, in which the first and second cyclic coils are disposed at right angles.

An eighth electromagnetic lane marker is constructed based on the first through seventh lane markers, in which the frequency conversion circuit is a frequency multiplier circuit which converts the second frequency to the frequency of multiples times of the first frequency.

A ninth electromagnetic lane marker is constructed based on the second through eighth lane markers, in which an "L-tap structure" is adopted for the second cyclic coil.

A tenth electromagnetic lane marker is constructed based on the first through eighth lane markers, in which a "C-tap structure" is adopted for the second cyclic coil.

An eleventh electromagnetic lane marker is constructed based on the first through tenth lane markers, in which the frequency conversion circuit is formed with a parallel rectifier structure.

A twelfth electromagnetic lane marker is constructed based on the first through tenth lane markers, in which the frequency conversion circuit is formed with a diode bridge.

A first electromagnetic lane marker detector of the present invention includes a means for transmitting electromagnetic waves of a specific frequency as the first frequency wave, and identifying and receiving electromagnetic waves of the second frequency converted from the first frequency and transmitted by the frequency conversion circuit coupled to the electrical resonator mounted on the electromagnetic lane marker.

A second electromagnetic lane marker detector of the present invention is constructed based on the first electromagnetic lane marker detector, in which a loop antenna is used to transmit the electromagnetic waves of the first frequency, and a bar antenna to receive the electromagnetic waves of the second frequency.

A third electromagnetic lane marker detector of the present invention is constructed based on the first and second electromagnetic lane marker detectors, in which a 8-letter shaped loop antenna is used to transmit the electromagnetic waves of the specific first frequency.

A third electromagnetic lane marker detector of the present invention constructed based on the first to third electromagnetic lane marker detectors includes a plurality of receiving antennas to receive electromagnetic waves of the specific second frequency and a position detector which maps, out the relative positions of the lane marker and the receiving antennas by comparing the intensity of the electromagnetic waves received by the antennas.

A fourth electromagnetic lane marker detector of the present invention constructed based on the first through fourth electromagnetic lane marker detectors, includes a means for monitoring the amount of lateral deviation of the vehicle from the markers and an alarm which alerts a driver when the vehicle exceeds a predetermined threshold.

A fifth electromagnetic lane marker detector of the present invention constructed based on the fourth electromagnetic lane marker detector, contains a means for changing the reference deviation in terms of the threshold distance from the lane marker, which is used as a reference to alert the driver.

A sixth electromagnetic lane marker detector of the present invention constructed based on the fourth and fifth electromagnetic lane marker detectors, includes an alarm comprising one of a visible alarm, an audible alarm such as a buzzer or a voice notification, and a vibration.

A seventh electromagnetic lane marker detector of the present invention constructed based on the fourth and fifth electromagnetic lane marker detectors, includes a lateral-deviation-sensitive alarm which changes the contents of the alerting according to the amount of the lateral deviation.

An eighth electromagnetic lane marker detector of the present invention constructed based on the first through seventh electromagnetic lane marker detectors, includes a transmitting means which is capable of detecting a speed of the vehicle, and when the speed is below a predetermined level, it stops transmitting the electromagnetic waves of the first frequency, and when above, it resumes transmission.

A ninth electromagnetic lane marker detector of the present invention constructed based on the first through eighth electromagnetic lane marker detectors, has a height-specific transmitting power controlling means which is capable of controlling the transmitting amplifiers such that the transmitting power changes according to a setting height of the vehicle.

A tenth electromagnetic lane marker detector of the present invention constructed based on the first through ninth electromagnetic lane marker detectors, has a height-sensitive transmitting power controlling means which is capable of detecting the height of the vehicle and controls the transmitting amplifiers such that the transmitting power changes according to the detected height of the vehicle.

A first vehicle positioning system of the present invention comprises the following elements:
1) an electromagnetic lane marker comprising the following elements:
   a) an electric resonator comprising a cyclic coil and a capacitor, which resonates with induction electromagnetic waves of a first frequency;
   b) a frequency conversion circuit coupled to the electric resonator, which converts the first frequency and transmits the electromagnetic waves of the second frequency
2) an identifying and receiving means for receiving the second electromagnetic frequency which is converted from the first frequency transmitted as a specific electromagnetic frequency and transmitted by the frequency conversion circuit coupled to the electrical resonator mounted in the electromagnetic lane marker.

In a second vehicle positioning system of the present invention which is based on the first vehicle positioning system, the electromagnetic lane markers are laid under the road.

According to a third vehicle positioning system, based on the second vehicle positioning system, electromagnetic lane markers laid at predetermined intervals support automatic driving.

DETAILED DESCRIPTION OF THE PREFERRED EMBODIMENTS

Figure 1:
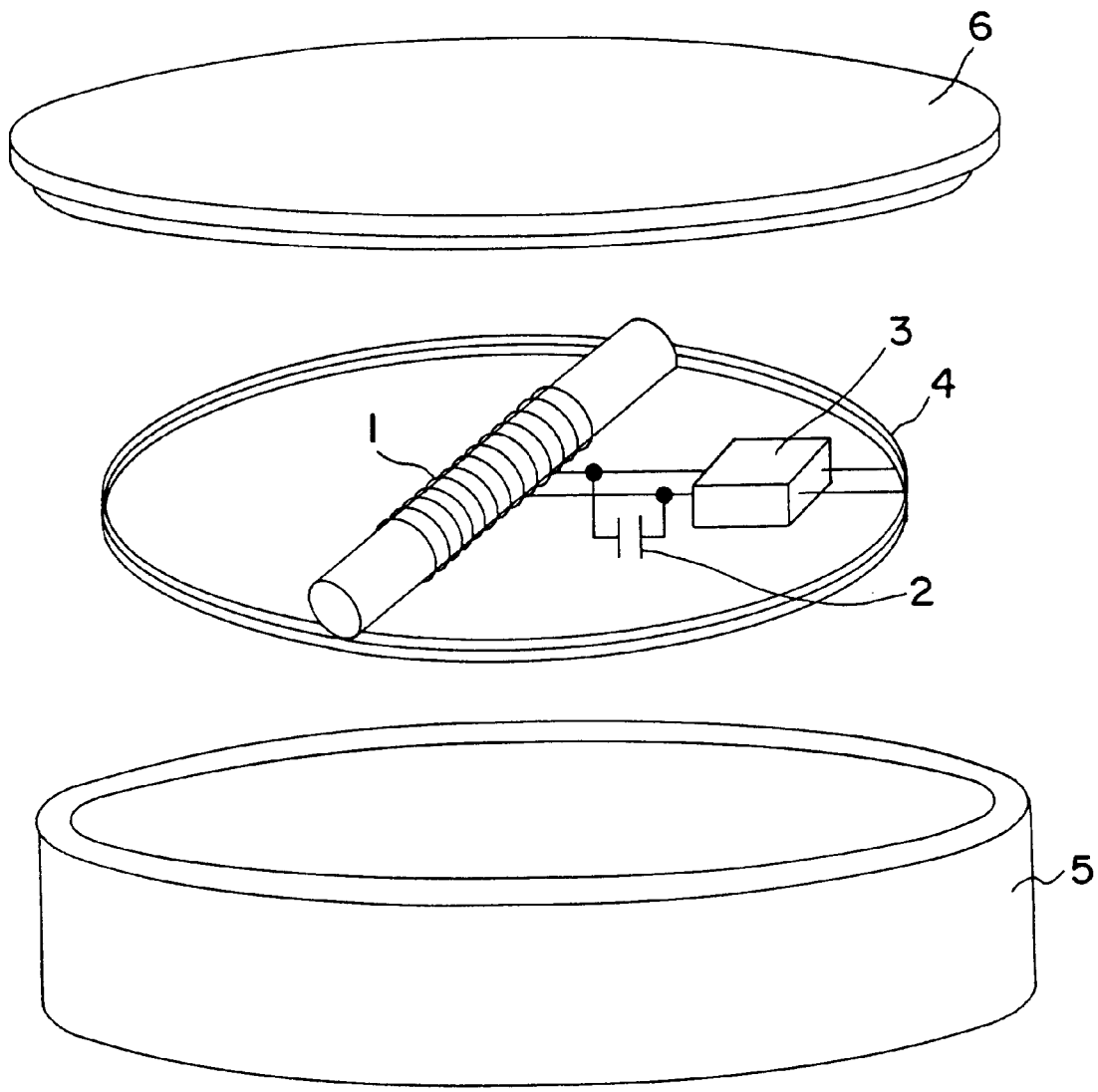
FIG. 1 is an exploded perspective view of an electromagnetic lane marker in accordance with a preferred embodiment of the present invention.

The preferred embodiments of the present invention, are described below in order. FIG. 1 is An exploded perspective view showing the structure of an electromagnetic lane marker in accordance with a preferred embodiment of the present invention. In FIG. 1, a first cyclic coil 1 comprises a bar antenna formed by winding a wire on a cylindrical ferrite. The first cyclical coil 1 and a capacitor 2 compose an electromagnetic resonator which receives and resonates with electromagnetic waves of the first frequency, and sends signals of the resonated first frequency to a frequency conversion circuit 3. The frequency conversion circuit converts signals of the first frequency to signals of the second frequency, and send them to a second cyclic coil 4. The second cyclic coil 4 transmits the received signals of the second frequency to the vehicle.

This construction allows the lane marker to transmit electromagnetic wave of the second frequency which are different from the electromagnetic wave of the first frequency it received. Therefore, lane markers can be identified without suffering interference of the electromagnetic wave of the first frequency.

The first cyclic coil comprises a bar antenna formed by winding a wire on a cylindrical ferrite core, and the second cyclic coil, a loop antenna. When the loop antenna is disposed horizontally, the height of the antenna as a whole becomes low. Furthermore, the antenna can effectively receive the electromagnetic waves transmitted by the vehicle horizontally.

In this embodiment, the first cyclic coil and second cyclic coil comprising a bar antenna and a loop antenna respectively are disposed such that their magnetic fluxes intersect at right angles. Due to this construction, directions of the electromagnetic waves to be received and electromagnetic waves to be transmitted intersect at right angles as well, so that interference between them can be avoided.

In this embodiment, the bar and loop antennas are used respectively as the first cyclic coil and the second cyclic coil. However, the first cyclic coil and second cyclic coil can also be made of loop and bar antennas respectively. In this case as well, by disposing the loop antenna flat, the height of the antenna as a whole can be kept low. In addition, the electromagnetic waves transmitted downward from the vehicle can be received and transmitted back to the vehicle effectively.

FIG. 1 also shows a cylindrical non-magnetic case 5 with a base and a lid 6, also made of non-magnetic materials. These members help maintain environmental resistance of the lane marker by tightly sealing it.

Since the non-magnetic case 5 and its lid 6 are buried underground after sealing the lane marker, they should be made with a material resistant to paving. To be more specific, a material is needed which would not degrade or deformed when asphalt at 230° C. is laid upon it and need to be resistant to weight of around 1 ton. It is preferable to use resin materials which do not suffer corrosion when exposed to oil and acid contained in asphalt and concrete.

In this embodiment, the lane maker is sealed with a lid, however, it can be integrally molded and the sealing is not limited to this method.

Figure 2:
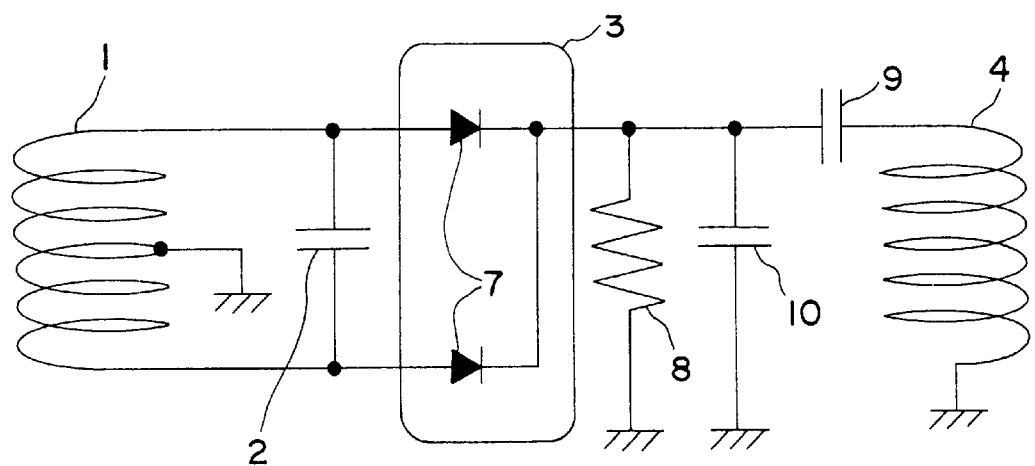
FIG. 2 is a circuit diagram of an electromagnetic lane marker in accordance with a preferred embodiment of the present invention.
Figure 3:
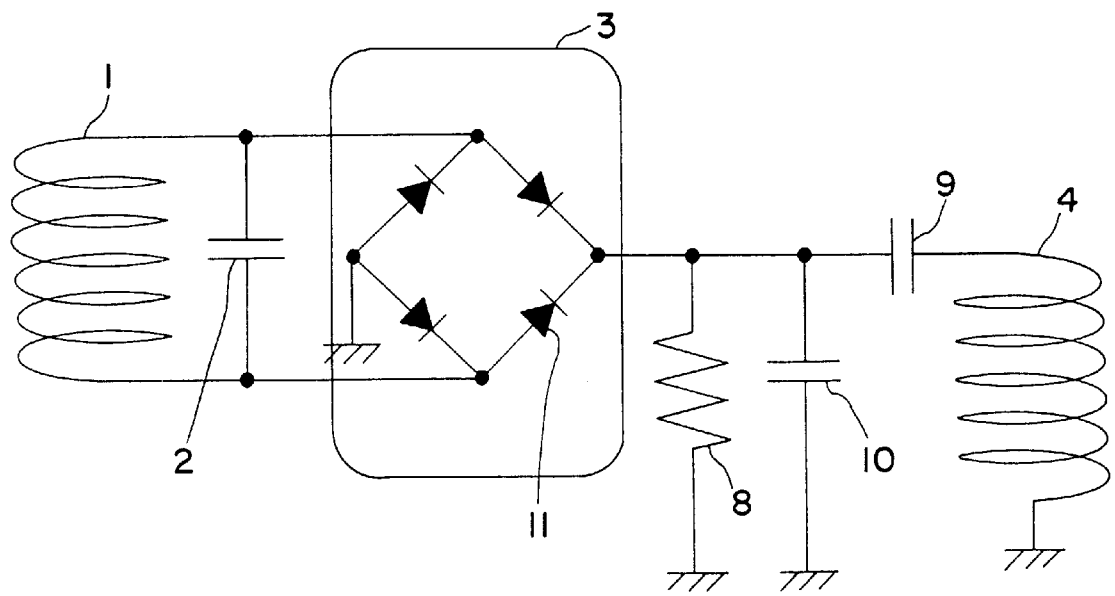
FIG. 3 is a circuit diagram of an electromagnetic lane marker in accordance with another preferred embodiment of the present invention.

With reference to FIGS. 2 and 3, structure of the frequency conversion circuit is described.

Figure 4:
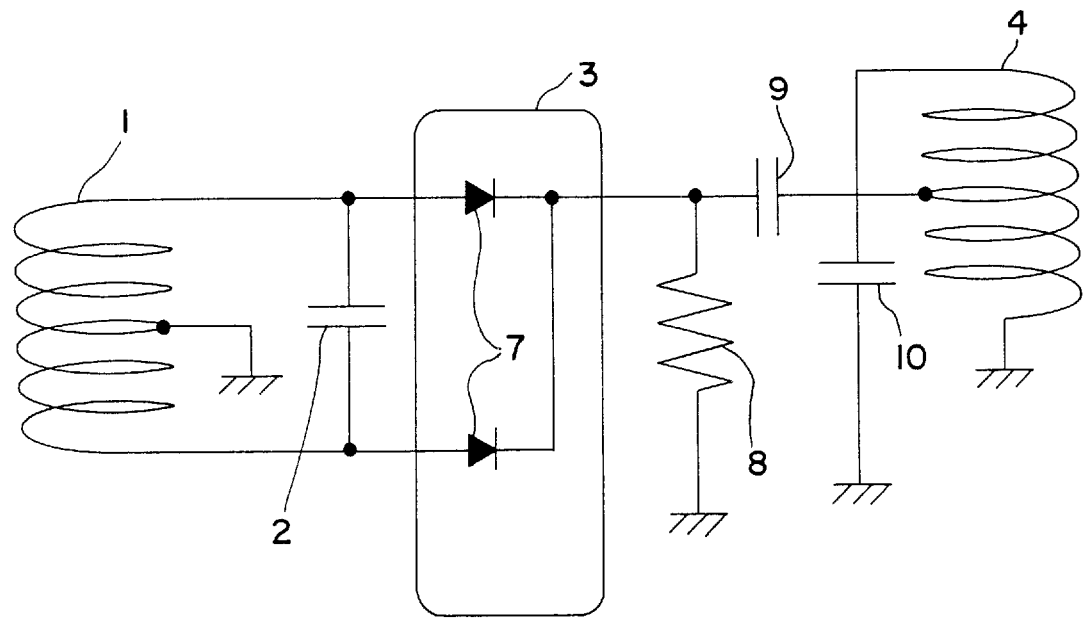
FIG. 4 is a circuit diagram of an electromagnetic lane marker in accordance with still another preferred embodiment of the present invention.
Figure 5:
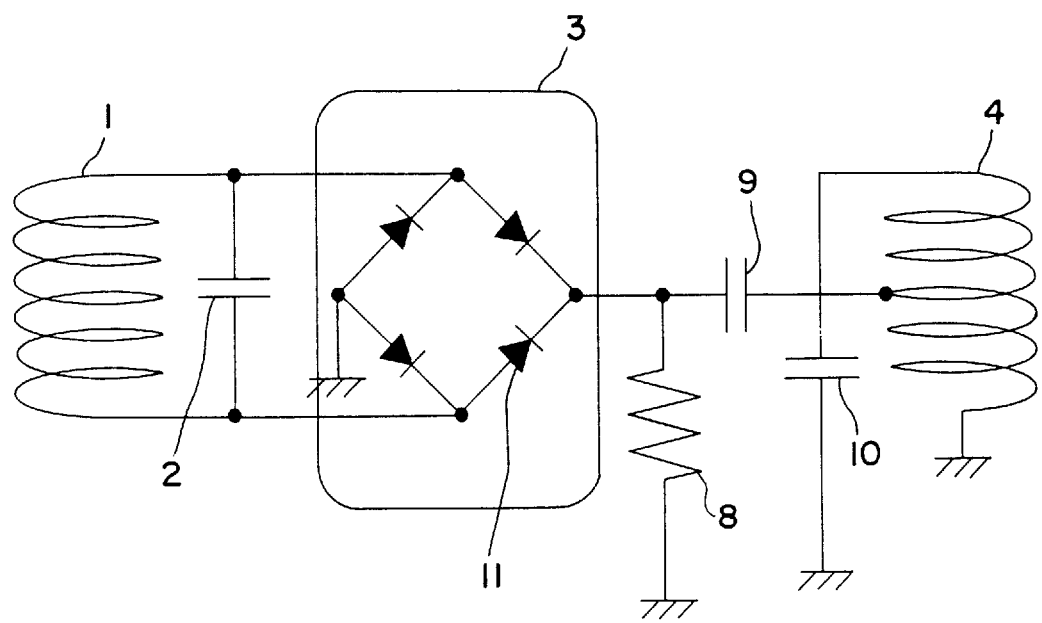
FIG. 5 is a circuit diagram of an electromagnetic lane marker in accordance with yet another preferred embodiment of the present invention.

FIGS. 2 and 3 are circuit diagrams of an electromagnetic lane marker in accordance with a preferred embodiment of the present invention. In FIG. 2, the frequency conversion circuit 3, which comprises diodes 7 connected parallel to each other, converts the first frequency to the second frequency which has the multiple value of the first frequency. When a diode bridge 8 shown in FIG. 3 is used in the frequency conversion circuit, a center tap of the first cyclic coil is not required since electric current refluxes via grounded contact point of the diode bridge. In this way, the structure of the coil can be simplified. In FIGS. 2 and 3, "C-tap structure" is adopted for the second cyclic coil 4, in which the voltage is divided by the capacitors. A preferred embodiment shown in FIGS. 4 and 5 adopts a "L-tap structure". In this L-tap structure, voltage is divided by a tap pulled out from the center of the second cyclic coil 4. In FIG. 4, L-tap structure is combined with the frequency conversion circuit 4 where diodes are connected parallel to each other, and in FIG. 5, the L-tap structure is combined with the frequency conversion circuit 4 with a diode bridge. The foregoing construction allows frequency of the received electromagnetic waves to be multiplied by rectifying them full-wave or double voltage. As such, the lane marker can convert frequencies without an oscillator circuit which requires power consuming elements. Furthermore, depending on the structure of the cyclic coil, either C-tap structure or L-tap structure can be selected.

An electromagnetic lane marker detector of a preferred embodiment is described below with reference to FIG. 6.

Figure 6:
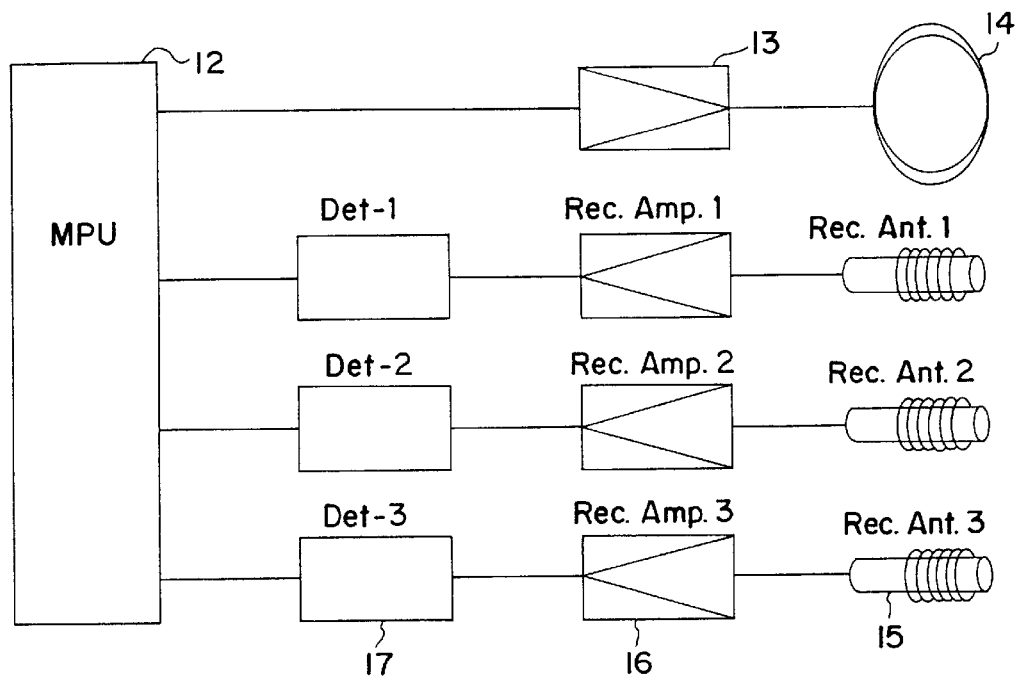
FIG. 6 is a block diagram of an electromagnetic lane marker detector in accordance with another preferred embodiment of the present invention.

FIG. 6 is a block diagram illustrating a structure of the electromagnetic lane marker of a preferred embodiment of the present invention.

FIG. 6 shows a microprocessor 12 (hereinafter, MPU) which controls the detector. Transmitting amplifier 13 amplifies and transmits the electromagnetic waves of the first frequency which is the resonance frequency of the lane marker required to be detected. A transmitting antenna 14 is a cyclic or a rectangular loop antenna. Receiving antennas are used for receiving electromagnetic waves reflected by the lane marker. The receiving antennas 15 are tuned so that they can effectively receive the electromagnetic waves of the first frequency. Receiving amplifiers 16 amplify signals received by the receiving antennas. Detection circuits 17 are disposed on the left, center and right of the vehicle. Three sets of the receiving antennas, the receiving amplifiers and the detection circuits are prepared to detect the lateral position of the vehicle with respect to the lane markers.

In the embodiment, loop and bar antennas are used as the antenna transmitting the electromagnetic waves of the first frequency and the antenna receiving the electromagnetic waves of the second frequency respectively. By constructing the transmitting antenna with a loop antenna, it can be disposed more flexibly. Furthermore, when an antenna with a large loop is used, electromagnetic waves can be transmitted into a larger area. Likewise, the bar antenna used as the receiving antenna can effectively receive electromagnetic waves sent back from the lane marker.

The following is a description of the operation of the electromagnetic lane marker detector constructed as described above.

The MPU 12 contains an oscillator circuit which oscillates the electromagnetic waves of the first frequency "f", a resonance frequency of the lane marker. The transmitting amplifier 13 amplifies electric power and sends it to the transmitting antenna 14 so that the electromagnetic waves are continuously emitted. In the meantime, the MPU 12 simultaneously receives electromagnetic waves. The receiving antennas 15 are disposed in the left, center and right of the vehicle, and tuned so that they can effectively receive the electromagnetic waves of the second frequency. When the vehicle drives near the lane marker, the lane marker resonates with the electromagnetic waves of the first frequency and reflects the electromagnetic waves of the second frequency. Signals of the electromagnetic waves transmitted by the lane marker and received by the receiving antennas 15 are amplified by the receiving amplifiers 16 and detected by the detection circuits 17, and detected data is sent to the MPU 12. The MPU 12 compares receiving signal strength in the left, center and right systems to detect the relative positions between the lane marker and the: three receiving antenna systems (1–3). Since the positions of the three receiving antenna systems in the vehicle are predetermined, the relative positions of the lane marker and the vehicle can be detected from the relative positions of the lane marker and the receiving antennas.

In this embodiment, a 8-letter-shaped loop antenna can be used as an antenna to transmit the electromagnetic waves of the first frequency. This 8-letter-shaped loop antenna transmits electromagnetic waves in its vicinity. Meanwhile, in a distance from the transmitting antenna, the electromagnetic waves transmitted from each of the two loops of the 8-letter-shaped antenna interfere with each other since their phases are different, and as a result, the influence of the electromagnetic waves on the outside of the system is mitigated.

Figure 7:
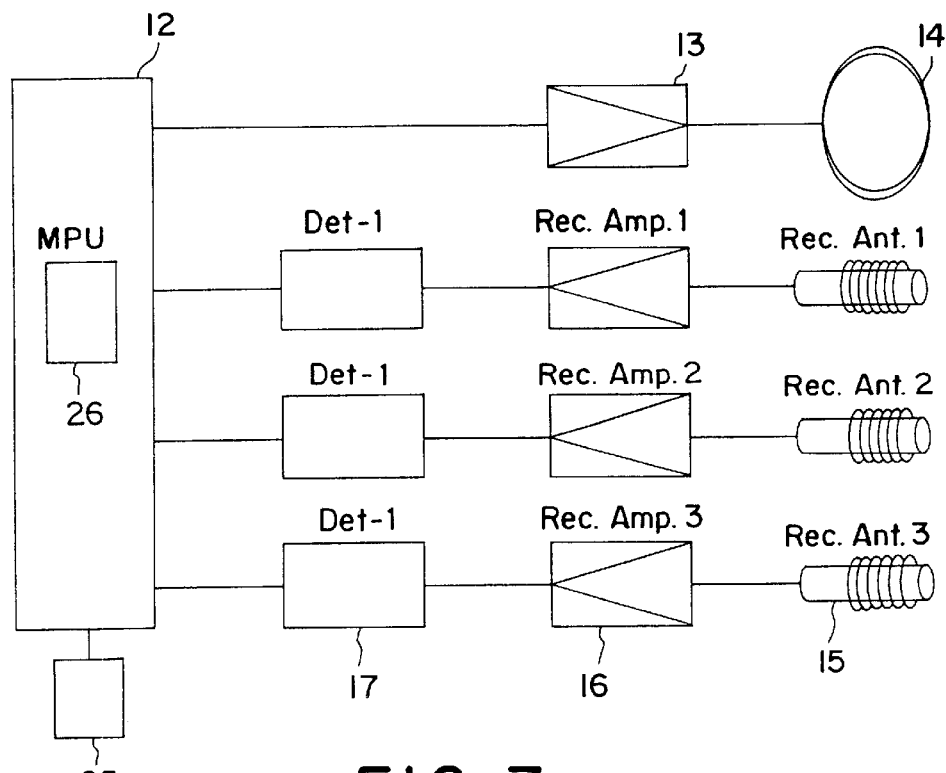
FIG. 7 is a block diagram of an electromagnetic lane marker detector in accordance with another preferred embodiment of the present invention.

Another embodiment of the present invention is described below. FIG. 7 is a block diagram illustrating another embodiment of the present invention. In the diagram, the MPU 12 includes a lateral deviation monitor which monitors lateral deviation of the vehicle and when the position of the vehicle with respect to the lane marker exceeds a predetermined threshold, signals are sent to an alarm 25. When receiving signals, the alarm 25 alerts the driver that the vehicle is beginning to move out of the lane. To alert the driver, such means as a buzzer and an alarm can be used. It is also possible to alert the driver by lighting or flashing a lamp, indicating on a display of the car navigation system, or vibrating the driver seat. This alerting will draw the driver's attention to the situation and adjust the driving course before the vehicle moves totally out of the lane.

The lateral deviation monitor of this embodiment detects the position of the vehicle which is beginning to deviate laterally with respect to the lane marker fixed to the predetermined position by detecting the intensity of the electromagnetic waves transmitted from the lane marker. In FIG. 7, the three receiving antennas 15 (1, 2, and 3) are respectively disposed on the left, center and right of the vehicle, each of which is receiving the electromagnetic waves from the lane marker. When the vehicle is driving in the center of the lane, the receiving antenna 2 receives stronger electromagnetic waves compared with the other antennas. In other wards, the detection circuit 17 connected to the receiving antenna 2 detects stronger electromagnetic waves.

When the vehicle starts to deviate to the right, the receiving antenna 1 disposed on the left of the vehicle begins to receive stronger signal than other receiving antennas, and once it exceeds a certain level, the lateral deviation monitor judges that the distance between the vehicle and the lane marker has exceeded a predetermined threshold and alerts the driver.

Likewise, when the vehicle starts to deviate to the left, the strength of the electromagnetic waves received in the receiving antenna 3 disposed in the right of the vehicle becomes stronger compared with other receiving antennas.

The MPU 12 can also include a means for changing the reference deviation, which contains a table showing the relationship between the speed and amount of lateral deviation of the vehicle. In the case of using this means for changing the reference deviation, reference values for lateral deviation can be set such that when driving at high speeds, an alarm is given with a small deviation and when driving at low speeds, a larger lateral deviation is allowed before alerting. This enhances safety for high-speed driving since alerting can be given even with a slight lateral deviation when driving at high speeds. For example, different reference values can be set for three stages of speed; up to 60 km/h, 60–80 km/h, and over 80 km/h, so that warnings can be sent out with smaller deviations as speed increases.

Furthermore, if a lateral-deviation-sensitive alarm, which issues different levels of warnings according to the amount of lateral deviation detected by the lateral deviation monitor, is adopted, the deviation of the vehicle can be shown, for example, in the following manner:

1) deviation up to a value "a", a green lamp lights up;
2) deviation between the value "a" and a value "b", yellow lamp blinks to announce the beginning of a deviation; and
3) deviation over the value "b", a buzzer starts to warn the deviation from the driving line is large.

The lower the position of the electromagnetic wave lane marker detector is, the lower the output that is required to detect the lane marker. The height of the vehicle changes depending on the number of passengers and amount of load. Based on this point, by introducing an output control means related to the height of a vehicle, and setting predetermined output levels of the transmitting amplifier in accordance with the heights of the vehicle detected by a height sensor, the best output level can be selected for the height. The sensor used for such output control means can detect the height either from the suspension of the vehicle or the travelling of the electromagnetic waves from the vehicle to the road and the road to the vehicle.

Figure 8:
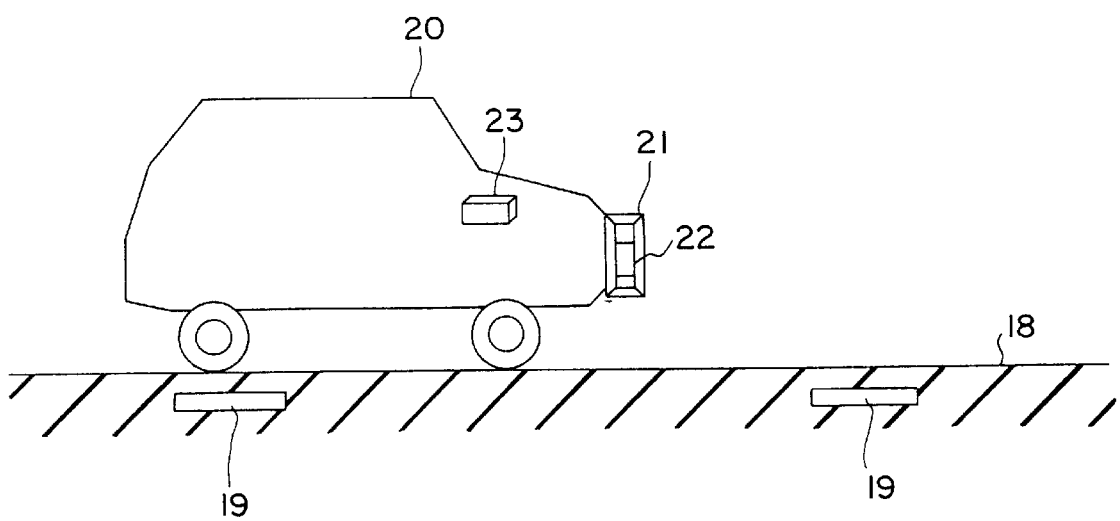
FIG. 8 is an explanatory diagram illustrating a vehicle positioning system based on an electromagnetic lane marker and its detector in accordance with preferred embodiments of the present invention.

FIG. 8 shows a structure of the vehicle positioning system in accordance with a preferred embodiment of the present invention. Lane markers 19 are laid under a road 18 in regular intervals, and a vehicle 20 has a transmitting antenna and receiving antenna 22 in the front and a detector unit 23 inside the vehicle. The vehicle detects and identifies the lane markers 19 as it runs. The detector unit 23 comprises an MPU, a transmission amplifier, receiving amplifiers, a detector circuit and power supply circuit. Needless to say, when a plurality of receiving amplifiers are used a detectable area can be expanded.

The vehicle positioning system of this embodiment can be achieved by freely combining the foregoing electromagnetic lane markers and lane marker detectors.

As thus far described, the lane markers of the present invention can reflect the electromagnetic waves whose frequency is different from that of the electromagnetic waves they receive. Therefore, the detector can receive and detect the electromagnetic waves reflected from the lane marker without interference from its own electromagnetic waves. Thus, the detector can provide a sufficient detection sensitivity and a detection distance as a device to be mounted on a vehicle.

Since the lane markers of the present invention transmit reflected electromagnetic waves only when it receives an exciting electromagnetic wave transmitted by the detector mounted on the vehicle, they do not have any influence on objects surrounding them. As such, a vehicle positioning system does not require further maintenance.

INDUSTRIAL APPLICABILITY

The lane markers of the present invention can reflect electromagnetic waves of the frequency deferent from that of the electromagnetic waves they received. Therefore, the detector can receive and detect the electromagnetic waves reflected from the lane marker without being influenced by its own electromagnetic waves. Thus, the detector can surely provide a sufficient detection sensitivity and a detection distance as a vehicle mounted device.

Since the lane markers of the present invention transmit reflected electromagnetic waves only when it receives exciting electromagnetic waves sent from the detector mounted on the vehicle, they do not have any influence to objects surrounding them. Due to this, a vehicle positioning system of the present invention does not require further maintenance.

What is claimed is:

1. An electromagnetic lane marker comprising;
   an electronic resonator comprising a cyclic coil connected to a capacitor,
   said electronic resonator resonates an inductive electromagnetic wave of a first frequency; and a frequency conversion circuit coupled to said electronic resonator,
   said frequency conversion circuit converts the electromagnetic wave of the first frequency to an electromagnetic wave of a second frequency and transmits the electromagnetic wave of the second frequency, said second frequency being different from said first frequency.

2. The electromagnetic lane marker of claim 1, further comprising a second cyclic coil for transmitting the electromagnetic wave of the second frequency.

3. The electromagnetic lane marker of claim 1, wherein said electronic resonator further comprising capacitors connected to both ends of said first cyclic coil, and said electronic resonator, said frequency conversion circuit and said second cyclic coil are stored in a sealing container made of a non-magnetic material.

4. The electromagnetic lane marker of claim 3, wherein said sealing container is a cylinder with a lid and a base.

5. The electromagnetic lane marker of one of claims 2 to 4, wherein said first cyclic coil and said second cyclic coil comprise loop antenna and bar antenna, respectively.

6. The electromagnetic lane marker of one of claims 2 to 4, wherein said first cyclic coil and said second cyclic coil comprise bar antenna and loop antenna, respectively.

7. The electromagnetic lane marker of claim 2, wherein said first cyclic coil and said second cyclic coils are disposed at right angles.

8. The electromagnetic lane marker of one of claims 1 to 4 further comprising a frequency multiplier circuit which converts the first frequency to the second frequency having a frequency which is multiples of the first frequency.

9. The electromagnetic lane marker of one of claims 2 to 4, wherein said second cyclic coil has a L-tap structure, where the L-tap structure means a coil having a tap therein.

10. The electromagnetic lane marker of one of claims 2 to 4, wherein said second cyclic coil has a C-tap structure, where, the C-tap structure means a capacitor circuit having a connecting point between at least two capacitors.

11. The electromagnetic lane marker of one of claims 1 to 4, wherein said frequency conversion circuit comprises rectifiers connected parallel with each other.

12. The electromagnetic lane marker of one of claims 1 to 4, wherein said frequency conversion circuit comprises a diode bridge.

13. An electromagnetic lane marker according to claim 1 wherein said electronic resonator is included in a passive circuit.

14. An electromagnetic lane marker detector for transmitting a first electromagnetic wave of a specified first frequency, said electromagnetic lane marker detector having a means for identifying and receiving an electromagnetic wave of a second frequency transmitted from an electromagnetic lane marker, said electromagnetic lane marker comprises:
an electronic resonator;
a frequency conversion circuit coupled to said electronic resonator, which converts said first electromagnetic wave to said electromagnetic wave of the second frequency, said electromagnetic lane marker having separate antennas for receiving said first electromagnetic wave and for transmitting said electromagnetic wave of the second frequency.

15. The electromagnetic lane marker detector of claim 14, wherein an antenna transmitting the electromagnetic wave of the specified first frequency and the antenna receiving the electromagnetic wave of the second frequency comprise a loop antenna and a bar antenna, respectively.

16. The electromagnetic lane marker detector of claim 14 or 15, wherein a means for transmitting electromagnetic waves of the specified first frequency comprises a 8-letter-shaped loop antenna.

17. The electromagnetic lane marker detector of one of claims 14 or 15 further comprising;
a plurality of receiving antennas which receive electromagnetic wave of a specified second frequency; and
a position detector for detecting positions of said receiving antennas with respect to the lane markers, said position detector comparing each strengths of said electromagnetic waves received by said plurality of receiving antennas.

18. The electromagnetic lane marker detector of one of claims 14 or 15, further comprising:
a lateral deviation monitor which monitors an amount of lateral deviation from a lane marker; and
an alarm which warns when lateral deviation exceeds a predetermined threshold.

19. The electromagnetic lane marker detector of claim 18 further comprising a means for changing an amount of a reference deviation, said means for changing the amount of the reference deviation being capable of changing the threshold of lateral deviation with respect to the lane marker, and said threshold being a reference for the alarm.

20. The electromagnetic lane marker detector of claim 18 further comprising an alarm which alerts the driver through one of an indicator, a buzzer, a voice notification and vibration.

21. The electromagnetic lane marker detector of claim 18 further comprising a lateral-deviation-sensitive warning means which changes a content of an alert according to an amount of lateral deviation with respect to the lane markers.

22. The electromagnetic lane marker detector of one of claims 14 or 15 further comprising a velocity-sensitive transmitting means for detecting the velocity of a vehicle on which the detector is mounted, wherein said velocity-sensitive transmitting means stops transmitting electromagnetic wave of said first electromagnetic wave of a specified frequency when the velocity of the vehicle is slower than a predetermined value and resumes transmitting when the velocity exceeds the predetermined value.

23. The electromagnetic lane marker detector of one of claims 14 or 15 further comprising a vehicle-height-sensitive output controlling means which, when a height of a vehicle is set, changes transmitting output levels by controlling a transmitting amplifier according to the set value.

24. The electromagnetic lane marker detector of one of claims 14 or 15, further comprising a vehicle-height-sensitive output controlling means which detects the height of the vehicle and changes transmitting output levels by controlling a transmitting amplifier according to the detected height.

25. An electromagnetic lane marker detector according to claim 14, wherein said electronic resonator is included in a passive circuit.

26. A vehicle positioning system based on:
A) an electromagnetic lane marker comprising;
an electronic resonator comprising a cyclic coil and a capacitor,
said electronic resonator resonates an inductive electromagnetic wave of a first frequency; and
a frequency conversion circuit coupled to said electronic resonator,
said frequency conversion circuit converts the electromagnetic wave of the first frequency to an electromagnetic wave of a second frequency and transmits the electromagnetic wave of the second frequency, said electromagnetic lane marker having separate antennas for receiving said first electromagnetic wave and for transmitting said electromagnetic wave of the second frequency; and B) an electromagnetic lane marker detector for transmitting the electromagnetic wave of the first frequency, said electromagnetic lane marker detector having a means for identifying and receiving the electromagnetic wave of the second frequency transmitted from said electromagnetic lane marker.

27. The vehicle positioning system of claim 26, wherein said electromagnetic lane marker is laid under a road.

28. The vehicle positioning system of claim 26, wherein said electromagnetic lane marker is laid under a road at predetermined intervals to support automatic driving.

29. A vehicle positioning system according to claim 26, wherein said electric resonator is included in a passive circuit.

\* \* \* \* \*

UNITED STATES PATENT AND TRADEMARK OFFICE
CERTIFICATE OF CORRECTION

PATENT NO. : 6,577,246 B1
DATED : June 10, 2003
INVENTOR(S) : Handa et al.

It is certified that error appears in the above-identified patent and that said Letters Patent is hereby corrected as shown below:

<u>Title page,</u>
Item [86], delete "Apr. 21, 2001" and insert -- March 21, 2001 --.

Signed and Sealed this

Sixteenth Day of March, 2004

JON W. DUDAS
*Acting Director of the United States Patent and Trademark Office*